Figure 1:
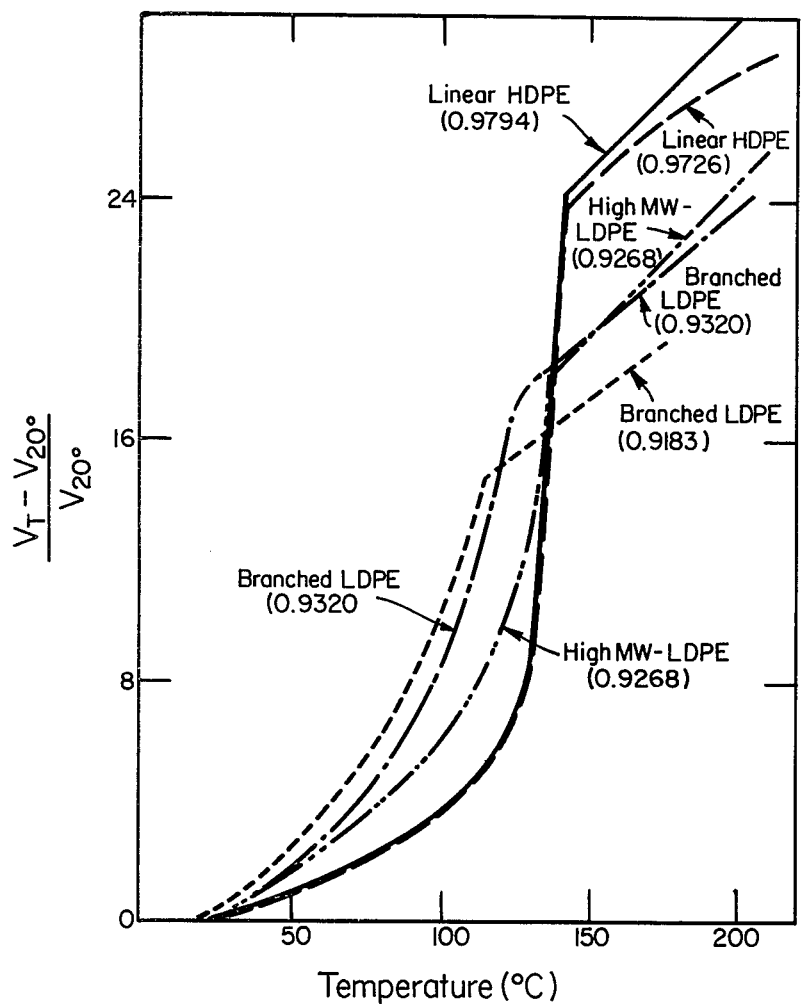

United States Patent [19]

Olabisi

[11] 4,255,368
[45] Mar. 10, 1981

[54] STRUCTURAL FOAM MOLDING PROCESS
[75] Inventor: Olagoke Olabisi, Plainfield, N.J.
[73] Assignee: Union Carbide Corporation, New York, N.Y.
[21] Appl. No.: 58,524
[22] Filed: Jul. 18, 1979

Related U.S. Application Data

[63] Continuation-in-part of Ser. No. 841,822, Oct. 13, 1977, abandoned.
[51] Int. Cl.³ .............................................. B29D 27/00
[52] U.S. Cl. ..................................... 264/45.5; 264/50; 264/51; 264/328.1; 264/DIG. 83; 425/4 R; 425/564
[58] Field of Search ............... 264/45.5, DIG. 83, 50, 264/51, 53, 54, 328; 425/4 R, 564

[56] References Cited

U.S. PATENT DOCUMENTS

| | | | |
|---|---|---|---|
| 3,773,873 | 11/1973 | Spaak et al. | 264/DIG. 83 |
| 3,960,996 | 6/1976 | Balevski et al. | 264/DIG. 83 |
| 4,129,635 | 12/1978 | Yasuike et al. | 264/45.5 |

FOREIGN PATENT DOCUMENTS

| | | | |
|---|---|---|---|
| 2461580 | 7/1975 | Fed. Rep. of Germany | 264/DIG. 83 |
| 123067 | 11/1976 | German Democratic Rep. | 264/DIG. 83 |
| 51-119063 | 10/1976 | Japan | 264/DIG. 83 |

Primary Examiner—Philip Anderson
Attorney, Agent, or Firm—Gerald R. O'Brien, Jr.

[57] ABSTRACT

A process is disclosed for molding a foamed thermoplastic article characterized by a foamed core, a non-foamed exterior shell and a surface that reproducibly and faithfully replicates a predetermined portion of the inner surface of the mold in which the article is made, wherein a foamable mixture comprising molten thermoplastic material and blowing agent is introduced through a nozzle into a mold cavity defined by said inner surface of said mold and expands and is rigidified while in said mold cavity.

3 Claims, 5 Drawing Figures

STRUCTURAL FOAM MOLDING PROCESS

This is a continuation-in-part of my prior copending patent application Ser. No. 841,822, filed Oct. 13, 1977 now abandoned and entitled "Structural Foam Molding Process."

The present invention relates to a novel structural foam (SF) process which permits molding in a cold mold and produces structural foam parts composed of a dense relatively non-foamed integral skin whose surface reproducibly and faithfully replicates a predetermined portion of the inner surface of the mold in which the article is made, and a foamed core whose cell structure is highly uniform.

The structural foam process, as we know it commercially today, was originally invented by Richard G. Angell, Jr. in the early 1960s. That process was described in U.S. Pat. Nos. 3,268,636 and 3,436,446. As early as that time the major shortcoming of structural foam, namely, surface irregularities, was recognized. These surface imperfections are collectively called the "swirl" pattern; it may or may not include blisters, pinholes, pockmarks and streaks. All these bubble-caused defects made it impossible to make a structural foam part whose surface replicates the interior mold surface.

A structural foam technology was later developed by Richard G. Angell, Jr. and co-workers which permits molding of structural foam articles having a surface that reproducibly and faithfully replicates the surface of the mold. That process was described in U.S. Pat. No. 3,988,403. While the technology employed is rather ingenious, it does present a process having a few recognizable economic disadvantages: the cycle time is at least about 50 percent longer, the cell structure is worse than in normal rough surface structural foam and the mold cost is about 25 percent higher due to the necessity of cyclically heating and cooling the mold in order to achieve surface replication. Furthermore, it is energy intensive.

Because of the economic return which would accrue from savings in cycle time, energy, mold cost and the possible extension of the useful life of the mold whose surface is to be replicated, it is desirable to provide a process which circumvents the attendant problems of the process described in U.S. Pat. No. 3,988,403.

In prior structural foam molding operations of the type disclosed in U.S. Pat. No. 3,268,636, the extruder is operated under a significant positive pressure and the mold is maintained at atmospheric pressure. Because of this, the molten foamable plastic undergoes a spontaneous foam formation on passing from the high pressure to the atmospheric pressure environment and the resulting foam proceeds to fill the mold. That is, the material state, its temperature, pressure, rheology, thermal contraction, bubble nucleation, growth and coalescence are uncontrolled; consequently, swirl pattern and non-uniform cellular structure result.

It has been found, in the practice of the process of this invention, that faithful and reproducible surface replication with uniform cell structure can be achieved by controlling the material state, its temperature, pressure, rheology, thermal contraction, bubble nucleation, growth and coalescence. By suitable choice of pressure and temperature, one can fix the state of the foamable material, the state of interest here being the single phase with the gas completely dissolved in the plastic material. At this state, the mold-filling process is as if the plastic material does not contain any foaming agent, similar in character to mold-filling in injection molding with no attendant surface defects. For example, from all available information, an SF machine operated at a nitrogen $\Delta P$ (the difference between the blowing agent pressure and the extruder barrel pressure) of 400 psi and a temperature of 200° C. yields a foamable resin containing nitrogen whose weight fraction is $\lesssim 3.75 \times 10^{-4}$ in polystyrene and $\lesssim 3.75 \times 10^{-3}$ in high density polyethylene. From available data which illustrates the actual pressure-composition behavior of polystyrene-nitrogen and high density polyethylene-nitrogen, it can be safely estimated that a back pressure of (400–600) psi in the mold would suffice to prevent foam formation. Assuming, therefore, that a molten foamable plastic is injected into a mold whose pressure is higher than the foaming pressure, no foaming would occur as the material fills the mold and bubble-caused surface defects will be absent on the surface of the part. That is, bubble formation has been prevented at least for the duration of time when the mold is being filled.

Another point considered in making structural foam by practicing the process of this invention is the material thermal expansion. When a thermoplastic material is heated at a constant pressure, the kinetic energy increases and the volume generally increases. For example, polyethylenes, at ambient temperatures, are in their semi-crystalline solid state.

As the temperature increases, thermal agitation disrupts the highly packed crystallites and the volume increases. At the melting range, the lattice pattern is completely disrupted and the polymer forms an essentially amorphous mass. At a temperature of about 200° C., the density difference between the amorphous melt and the crystalline solid range between ~20% and 30% depending on the original crystallinity of the particular polyethylene. High density linear polyethylene usually gives the largest density difference (~30%). The curves of FIG. 1 of the drawings illustrate this relationship between percentage of volume change (contraction) as a function of temperature for various polyethylene resins.

This implies that if a mold whose cavity is 100 cc is filled completely with high density polyethylene at 200° C., and the system is cooled to 20° C., the total volume of the product will be ~70 cc. The surface, of course, would be wrinkled owing to the combined effects of crystallization and thermal contraction.

If, however, the same mold is filled with foamable resin, against a back pressure high enough to prevent foaming, and the back pressure is released after the mold is completely filled, the following would result. The melt will first assume the contour of the mold without imparting the aforementioned bubble-caused irregularities. The skin will solidify while the interior of the melt will foam; such foams would occupy the volume being created by the normal thermal contraction of the polyethylene on cooling. Fortunately, the interior cools last and the internal pressure of the piece is high enough to allow bubbles to form in the core rather than wrinkles on the surface. For this reason, the level of blowing agent (or $\Delta P$ in the case where nitrogen gas is used as the blowing agent) is also a critical parameter in that it determines the magnitude of the foaming pressure, $P_f$. As the incoming plastic melt pushes back the gas responsible for the back pressure, some of this gas will be trapped in the micro-cavities in the mold. In order not to have surface micro-heterogeneity on the molded part surface, the foaming pressure must be of the same order of magnitude as the gas pressure in the micro-cavities whose value is approximately the same as the back pressure. Hence, not only is the back pressure, $P_b$, the $\Delta P$ and the $P_f$ important, the difference between the $P_f$ and the $P_b$ has a primary influence on the microgeometry of the structural foam surface. These pressures also play an important part in controlling the shear velocity and the thermal contraction of the foamed plastic as well as the nucleation, growth and coalescence of the bubble, all of which are important in determining the cellular structure and surface quality of the finished SF product.

For some thermoplastic material, the density reduction will not be as substantial on account of the absence of crystallinity. For example, if the foamable polystyrene is fed into the mold at a temperature of 288° C., the maximum achievable density reduction is only ~12.4%

The process of the present invention takes advantage of such combined thermal contraction phenomena together with the pre-backpressure mold technique and leads to the following results:

(a) Since the plastic does not foam on entering the mold, surface irregularities common with the normal SF are absent even if the mold is cold.

(b) Because of the backpressure, the plastic faithfully replicates the mold surface. A cold mold surface is most beneficial since the enveloping skin rigidifies fast while the interior remains molten and therefore foamable.

(c) On release of the backpressure, the molten foamable plastic in the interior foams.

(d) Because of the contracting phenomena, the cell structure control is considerably improved compared to that employed in present commercial technology.

From the data previously discussed, a back pressure of greater than approximately 300 psi in the mold is generally sufficient to produce structural foam with reproducible and faithful surface replication in a cold mold, it being understood that the following process variables are determinative of the attainment of the surface replication:

(i) Level (concentration) of foaming agent in the plastic material (in the case of chemically generated blowing agent);

(ii) The difference between the blowing agent pressure and the extruder barrel pressure, $\Delta P$, determining $P_f$. It should be noted that $P_f$ is not directly measurable; it can only be determined after-the-fact through $\Delta P$;

(iii) The duration of time it takes to introduce the foamable plastic charge into the mold, $t_a$;

(iv) The back pressure, $P_b$;

(v) The time, $t_{b1}$, when the back pressure is applied (this is usually the zero time of the cycle, i.e., t=o);

(vi) The time, $t_{b2}$, when the back pressure is released;

(vii) The difference between $P_f$ (and/or $\Delta P$) and $P_b$;

(viii) The temperature, $T_m$, at which the mold is maintained;

(ix) The temperature, $T_p$, of the foamable plastic charge; and (x) The total time, tt, the article spends in the mold.

The values of these variable process parameters must be coordinated, in accordance with one aspect of the invention, to make structural foam with uniform cell structure and reproducible and faithful surface replication.

It is further understood that: $P_b$, $P_f$, and $\Delta P$ have a primary influence on surface quality of the product, skin thickness and cell structure; $(P_b - P_f)$ has a primary influence on surface microgeometry of the product; $t_{b1}$ and $t_{b2}$ have a primary influence on surface quality, skin thickness and cell structure; $t_a$ has a primary influence on surface quality; $T_p$ must be high enough to permit rapid mold filling, but not too high so as to be able to prevent foam formation at a reasonable level of $P_b$; $T_m$ must be low enough for the structural foam product to rigidify within an acceptable time period; for a given mold temperature, tt must be sufficient for the product to have a self-supporting skin strong enough to prevent any deformation, due to residual $P_f$, after the part is taken out. The injection pressure should be such that melt fracture is not induced in the single phase foamable plastic material as it fills the mold.

In accordance with the present invention, a process is provided for molding a foamed thermoplastic article characterized by a foamed core, a non-foamed exterior shell, and a surface that faithfully and reproducibly replicates a predetermined portion of the inner surface of the mold which comprises: feeding as a charge a molten mixture of a thermoplastic polymer and a soluble gas foaming agent into a mold maintained at a temperature sufficiently low to cause the outer portion of said mixture to form a self-supporting exterior shell in said mold and at a volume sufficient, in the unfoamed state, to substantially fill said mold cavity; allowing the outer portion of the charge to cool in said cavity to form a self-supporting exterior shell while maintaining the mold cavity at a pressure above the foaming pressure of said mixture; thereafter releasing the pressure within the mold cavity to provide a temperature and pressure gradient to cause (i) the thermoplastic material therein to contract and (ii) gas desolubilization and expansion so as to balance the volume contraction of said charge which would otherwise have resulted from said gradients, to produce a foamed core and exterior solid shell; and removing the resultant article from said mold cavity.

The invention employs thermoplastic polymers such as high and low density polyethylene, polypropylene, ethylene/vinyl acetate copolymer, ethylene/ethyl acrylate copolymer, and other homopolymers and interpolymers of olefins; polystyrene and styrene copolymers such as a polymer of acrylonitrile, styrene, and butadiene; polycarbonates such as 4,4'-bisphenol-A-based polycarbonate; acetal homopolymers and copolymers; polyamides such as nylon 6 and nylon 6/6; polyaryl polyhydroxy ethers (e.g., the high molecular weight, base-catalyzed, condensation product of 4,4'-bisphenol-A and epichlorohydrin); polysulfones; polyesters such as polyethylene terephthalate; polymethyl methacrylate and other acrylic polymers; and other thermoplastic polymers, which can be employed either singly or in mixtures. Conventional additives such as heat and light stabilizers, antioxidants, fillers, dyes and other colorants, can be employed in the thermoplastic polymer.

The blowing agent that is employed in the invention can be a dissolved material that is a gas after the back pressure is released, and at the temperature conditions in the mold. Such materials include nitrogen, carbon dioxide, pentane, methylene chloride, trichloromonofluoromethane, dichlorodifluoromethane, and trichlorotrifluoroethane.

Chemically generated blowing agents which are evolved from the thermal decomposition of solid compounds can also be employed either alone, in mixtures thereof, or in mixtures with a dissolved material. Illustrative solid compositions which decompose to form gaseous blowing agents include azo compounds, N-nitroso compounds, sulfonyl hydrazides, sulfonyl semicarbazides, and salts and esters of azodicarboxylic acid. Specific illustrative examples include azodicarbonamide, azobisisobutyronitrile, dinitroso pentamethylene tetramine, N,N'-dinitroso-N-N'-dimethylterephthalimide, 4,4'-oxybis (benzenesulfonyl hydrazide), p-toluene sulfonyl semicarbazide, p,p'-oxybis (benzene sulfonyl semicarbazide), the barium salt of azodicarboxylic acid, and diisopropyl azodicarboxylate.

It is to be understood that, when the charge of molten plastic material-blowing agent mixture is fed to the mold cavity maintained under back pressure conditions in accordance with the invention, the charge substantially fills the mold cavity.

Referring specifically to the discussion hereinabove with respect to capability of volume change (contraction) as a function of temperature, as related to FIG. 1 of the drawings, it is to be understood that in the practice of the process of the present invention there is a balancing of this tendency of such contraction by the presence of gas desolubilized from the molten interior of the thermoplastic charge which expands to balance the volume contraction which would otherwise have resulted from the temperature and pressure gradients within the molten charge. This self-balancing offset within the molten charge is a unique effect in the process of the present invention.

In the drawings:

FIG. 1 discloses a set of curves for five different polyethylenes of various compositions and densities (at 20° C.) based upon data set forth in Macromolecules, vol. 8, No. 2, March-April 1975, Olabisi et al. entitled "Pressure-Volume-Temperature Studies of Amorphous and Crystalizable Polymers", pp 206 et seq.

Figure 2:
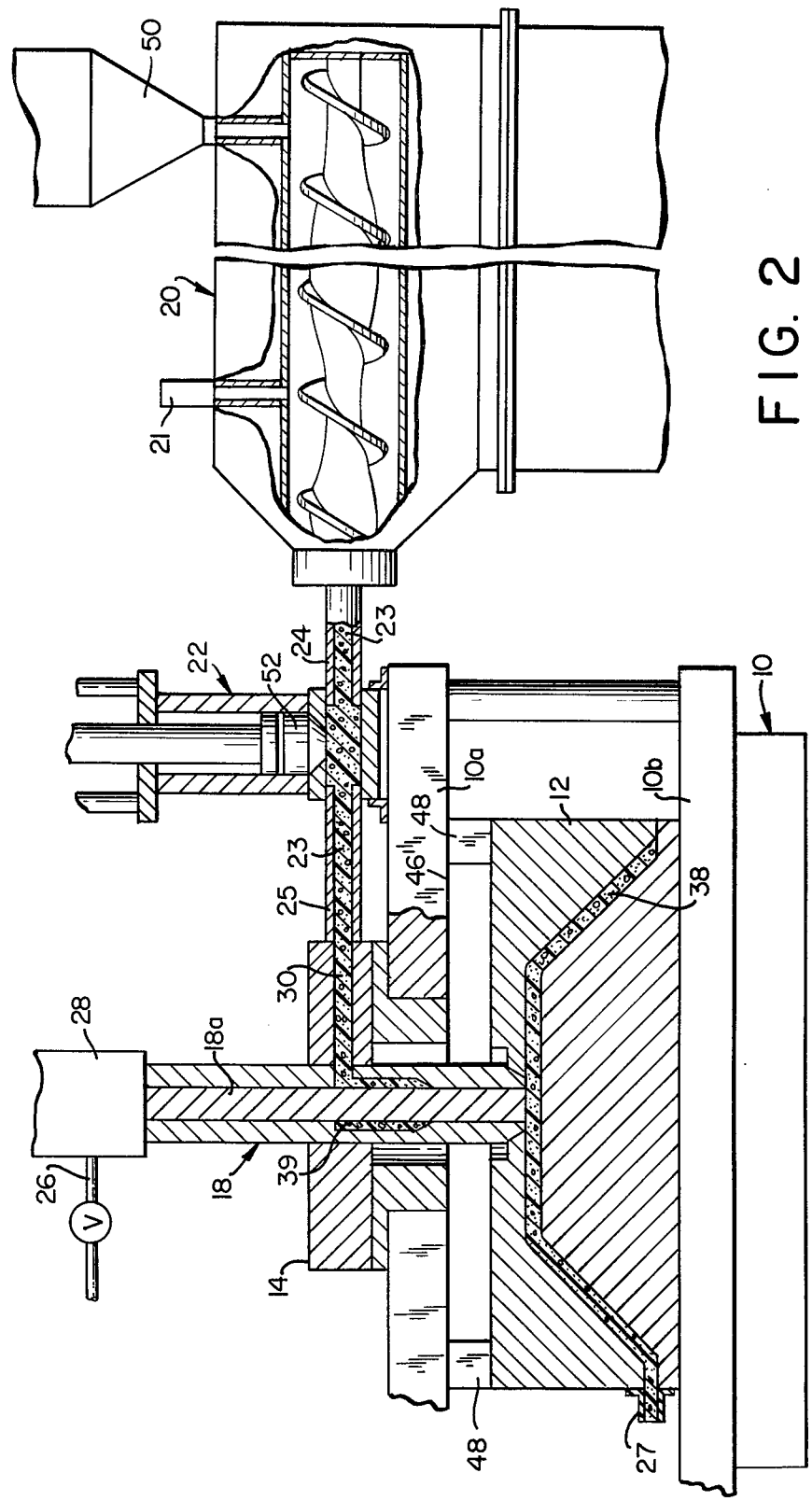
Figure 3:
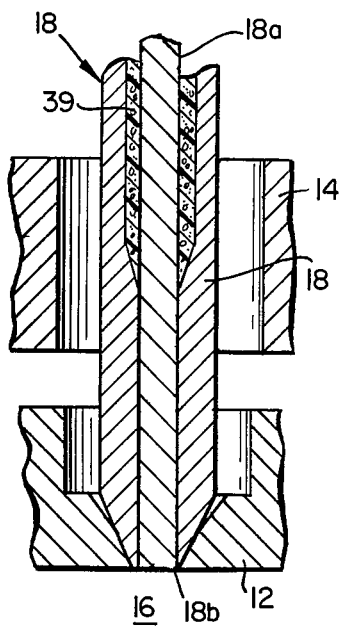
Figure 4:
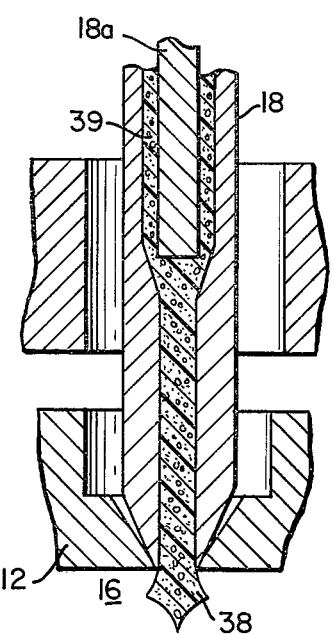
Figure 5:
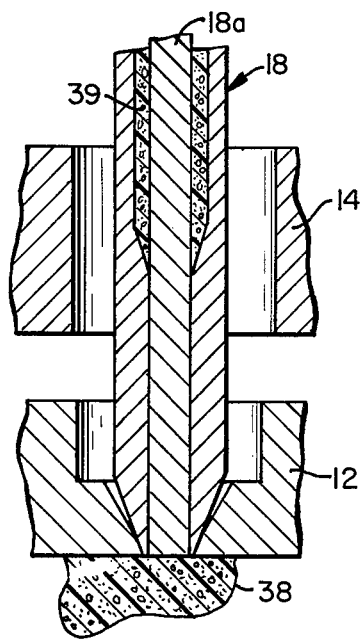

FIG. 2 is an elevational schematic view, partially in section, of apparatus capable of practicing the process of the present invention to produce structural foam articles; and FIGS. 3 through 5 are a series of sectional schematic views of the nozzle of the type employed in the production of structural foam articles in accordance with the process of the invention, depicting the process step sequence and plastic material-gas mixture flow through the nozzle in the process of the invention to produce novel structural foam articles.

Referring specifically to the drawings, apparatus suitable for practicing the process of the invention is shown schematically in the embodiment of FIG. 2 wherein press 10, having platens 10a and 10b, supports mold 12 and plastic material-gas mixture is introduced under pressure through manifold 14 to the mold cavity 16. The plastic material is fed from a feeding device 20 which may comprise a high shear melting extruder to an accumulator 22. A plastic material-gas mixture is formed in the extruder by the injection of gas through inlet means 21. The molten plastic material-gas mixture 23 is passed under pressure through conduit 24 to accumulator 22.

The plastic material-gas mixture 23 is fed from the accumulator 22 through conduit 25 to manifold 14.

Pneumatic actuator means 28 is mechanically connected to the inner portion of nozzle assembly 18 which is movably positioned so as to be raised and lowered within the nozzle assembly housing which is secured to manifold member 14.

As shown in FIG. 2, the mold interior has first been back-pressured by the introduction of gas therein through conduit 27. Plastic conduit 25 and manifold passage 30 have been filled with plastic material. The mold cavity 16 has then been substantially filled with a quantity of plastic material-gas mixture 38 so as to assume the contour of the mold cavity. The inner portion of nozzle assembly 18 is then lowered (as shown) by actuation of pneumatic actuator 28 to interrupt the flow of plastic through manifold passage 30 and annular space 39 and to position the lower end of the nozzle assembly 18 flush with the interior of the mold cavity.

The back pressure is maintained in the mold until the outer skin of the article becomes self-supporting. The back pressure through conduit 27 is then released.

As shown in the apparatus of FIG. 2, solid plastic particles or pellets may be fed to the hopper 50 of a conventional extruder 20 for the plasticating of plastic material. Plastic material 23 is then fed through conduit 24 to an accumulator 22 having movable piston member 52 to provide a chamber for receiving and storing the plastic material 23 before passage through manifold passage 30 toward the nozzle rod assembly 18.

The first sequence-of-operation, as shown in FIG. 3 of the drawings, depicts the nozzle sleeve 18 in the fully closed position with respect to the flow of plastic material-gas mixture therethrough.

The sequence-of-operation shown in FIG. 4 of the drawings depicts the relationship of the elements of nozzle assembly 18 for the step of the process of the invention in which plastic material-gas mixture passes through the nozzle assembly, through the annular space 39 within the nozzle outer housing, into the mold.

The sequence-of-operation shown in FIG. 5 of the drawings depicts the fluid inlet conduits and passages in the closed position during that step of the process in which internal foaming occurs within the article in the mold to provide a finished structural foam article.

The following three examples of the process of the invention were carried out with a high impact polystyrene composition (84% polystyrene, 10% polybutadiene, 5% mineral oil, 1% additive blend (HIPS) having density of 1.04 gm/cc MI-0.93 gm/10 min. ASTM-D-1238E; Heat Distortion Temp=75.3° C. ASTM-D-648.) The mold employed was a commercial mold for the production of tote boxes having the dimensions: 4.5" height; 12" width; 16" length; $\frac{3}{8}$" thickness; and having a top lip and slightly curved vertical corners. The interior of the tote box is free of internal dividers. Table below sets forth the parameters and corresponding data for these examples.

TABLE III

| PROCESS PARAMETERS | EXAMPLES | | |
|---|---|---|---|
| Example No. | 1 | 2 | 3 |
| Plastic material | HIPS | HIPS | HIPS |
| Blowing Agent | $N_2$ | $N_2$ | $N_2$ |
| Melt temp., °F. | 475 | 475 | 475 |
| Mold temp., °F. | 140 | 140 | 140 |
| Fill time, sec. | 12 | 12.5 | 13 |
| Extruder pressure, discharge, psi | 3000 | 3000 | 3000 |
| Extruder pressure, barrel, psi | 1300 | 1300 | 1300 |
| Blowing agent pressure, psi | 1400 | 1400 | 1400 |
| ΔP psi | 100 | 100 | 100 |
| Accumulator pressure, psi | 2950 | 2950 | 2950 |
| Shot weight, lbs. | 4.62 | 4.69 | 4.71 |
| Press force, tons | 60 | 60 | 60 |
| Back pressure, psi | >600 | 800 | 850 |
| Color painted | brown | black | red |

EXAMPLE NO. 4

The process of the present invention was carried out with polypropylene homopolymer (Shell 5024); 0.91 solid density, 5.0 Melt Flow). The mold employed was a commercial mold for the production of toilet tank top articles. The melt temperature was 438° F. and the blowing agent employed was gaseous nitrogen. Other parameters were recorded as follows:

| | |
|---|---|
| $\Delta P$, ($P_f$), psi | 150 |
| Accumulated Displacement, in$^3$ | 70 |
| BP, $P_B$, psi | 400 |
| Fill Time sec. | 6.9 |
| Time $P_B$ on, sec. | 0.0 |
| Time $P_B$ off, sec. | 10.0 |
| Total Cycle Time, sec. | 160 |
| Molded Density | 0.81 |
| % Density Reduction | 11.0 |

EXAMPLE NO. 5

The same composition of Example No. 4 was carried out employing nitrogen gas as the blowing agent, a melt temperature of 510° F., and provided the following parameters:

| | |
|---|---|
| $\Delta P$, ($P_f$), psi | 100 |
| Accumulated Displacement, in$^3$ | 70 |
| BP, $P_B$, psi | 400 |
| Fill Time, sec. | 10.7 |
| Time $P_B$ on, sec. | 0.0 |
| Time $P_B$ off, sec. | 20.0 |
| Total Cycle Time, sec. | 160 |
| Molded Density | 0.80 |
| % Density Reduction | 12.1 |

EXAMPLE NO. 6

The same composition of Examples Nos. 4 and 5 was carried out employing nitrogen gas as the blowing agent, a melt temperature of 510° F., and provided the following parameters:

| | |
|---|---|
| $\Delta P$, ($P_f$), psi | 100 |
| Accumulated Displacement, in$^3$ | 69 |
| BP, $P_B$, psi | 500 |
| Fill Time, sec. | 17.4 |
| Time $P_B$, on, sec. | 0.0 |
| Time $P_B$, off, sec. | 20.0 |
| Total Cycle Time, sec. | 160 |
| Molded Density | 0.80 |
| % Density Reduction | 12.1 |

A currently utilizable prior art process involves injecting a molten foamable plastic material (in an amount less than the mold cavity volume) into a prepressurized mold whose pressure $P_b$ is high enough to prevent foaming, then injecting gas through a nozzle into the charge of plastic material in the mold. Because the foamable plastic charge is in an amount less than the mold cavity volume, the nozzle pressure, $P_n$, must be greater than the back pressure $P_b$ in order that the plastic material can be pushed to the periphery of the mold. Shortly after the plastic material has assumed the contour of the mold surfaces, both the back pressure and the nozzle pressure are released. Such a process is disclosed in U.S. Pat. No. 4,129,635 to Yasuike et al.

The process of the present invention produces a more uniform structural foam article having a much finer internal cell structure. In addition, the present invention process provides better foaming process control since foam over-expansion is not possible (as it is in the prior art process) because of the self-balancing of contraction by internal foaming. The prior art process could permit an uncontrolled supply of foaming gas.

Further, the present process provides a gradual and progressing bubble formation while the prior art process produces abrupt, instantaneous gas bubble availability. This results in coarse bubbles in articles of the prior art and fine bubbles in articles of the present process.

Finally, the apparatus required for the prior art process is much higher in clamping force than that for the present process. This results in requiring a stronger, more expensive mold for the prior art process, or for a given molding machine size, the present process can mold larger parts than the prior art process. Even with a full shot (rather than a short shot) of the process of the present invention, one still needs lower pressures because of greater thickness required for foam, as against higher pressures required for solid injection molding for production without contraction (warpage).

What is claimed is:

1. A process for molding a foamed thermoplastic article characterized by a foamed core, a non-foamed exterior shell, and a surface that faithfully and reproducibly replicates a predetermined portion of the inner surface of the mold which comprises: feeding as a charge a molten mixture of a thermoplastic polymer and a soluble gas foaming agent into a mold maintained at a temperature sufficiently low to cause the outer portion of said mixture to form a self-supporting exterior shell in said mold and at a volume sufficient, in the unfoamed state, to substantially fill said mold cavity; allowing the outer portion of the charge to cool in said cavity to form a self-supporting exterior shell while maintaining the mold cavity at a pressure above the foaming pressure of said mixture; thereafter releasing the pressure within the mold cavity to provide a temperature and pressure gradient to cause (i) the thermoplastic material therein to contract and (ii) gas desolubilization and expansion so as to balance the volume contraction of said charge which would otherwise have resulted from said gradients, to produce a foamed core and exterior solid shell; and removing the resultant article from said mold cavity.

2. The process in accordance with claim 1, wherein said thermoplastic material is a material selected from the group consisting of polystyrene and polypropylene.

3. The process in accordance with claim 1, wherein said blowing agent is a gas selected from the group consisting of carbon dioxide and nitrogen.

* * * * *